US011025152B2

(12) United States Patent
Mottier et al.

(10) Patent No.: US 11,025,152 B2
(45) Date of Patent: Jun. 1, 2021

(54) LINEAR MOTOR SYSTEM AND AN INTERFACE APPARATUS FOR A LINEAR MOTOR

(71) Applicant: ETEL S.A., Motiers (CH)

(72) Inventors: Samuel Mottier, Neuchatel (CH); Jean-Pierre Morel, Les Fourgs (FR)

(73) Assignee: ETEL S.A., Motiers (CH)

( * ) Notice: Subject to any disclaimer, the term of this patent is extended or adjusted under 35 U.S.C. 154(b) by 57 days.

(21) Appl. No.: 16/718,237

(22) Filed: Dec. 18, 2019

(65) Prior Publication Data

US 2020/0204055 A1     Jun. 25, 2020

(30) Foreign Application Priority Data

Dec. 19, 2018 (EP) ..................................... 18213984

(51) Int. Cl.
*H02K 41/035* (2006.01)
*B65G 23/23* (2006.01)

(52) U.S. Cl.
CPC ......... *H02K 41/0356* (2013.01); *B65G 23/23* (2013.01)

(58) Field of Classification Search
CPC .................................................... H02K 41/00
USPC .................... 310/12.01, 12.02, 12.16, 13, 14
See application file for complete search history.

(56) References Cited

U.S. PATENT DOCUMENTS

| 5,701,042 | A | * | 12/1997 | Takei | .................. | H02K 41/031 |
| | | | | | | 310/12.01 |
| 6,375,356 | B1 | | 4/2002 | Rehm et al. | | |
| 7,109,610 | B2 | * | 9/2006 | Tamai | .................. | H02K 41/03 |
| | | | | | | 310/12.19 |
| 7,745,963 | B2 | * | 6/2010 | Jenny | ..................... | H02K 41/02 |
| | | | | | | 310/12.01 |
| 8,030,804 | B2 | | 10/2011 | Aso et al. | | |
| 2005/0258689 | A1 | * | 11/2005 | Kitade | .................. | H02K 41/03 |
| | | | | | | 310/12.25 |

FOREIGN PATENT DOCUMENTS

| DE | 4301434 | A1 | * | 7/1994 | ............... B23Q 1/58 |
| DE | 19839334 | A1 | | 3/2000 | |
| DE | 19925069 | A1 | * | 12/2000 | ............... B23Q 5/28 |
| DE | 19939207 | A1 | * | 2/2001 | ............... B23Q 1/40 |
| DE | 19939207 | A1 | | 2/2001 | |
| DE | 10003851 | A1 | * | 8/2001 | ........... H02K 41/031 |
| DE | 10320553 | A1 | * | 12/2004 | ........... H02K 41/031 |
| FR | 2901926 | A1 | * | 12/2007 | ........... H02K 41/031 |
| JP | 59011767 | A | * | 1/1984 | ............. H02K 41/03 |

* cited by examiner

*Primary Examiner* — Jose A Gonzalez Quinones
(74) *Attorney, Agent, or Firm* — Leydig, Voit & Mayer Ltd.

(57) ABSTRACT

An interface apparatus for releasably attaching a primary part of a linear motor to a carriage includes an attachment module configured to attach the primary part of the linear motor to the interface apparatus. At least one insertion portion is configured to permit insertion into a holding portion of the carriage along an axial direction of the linear motor. At least one blocking apparatus is configured to releasably block the at least one insertion portion in the holding portion of the carriage.

13 Claims, 4 Drawing Sheets

LINEAR MOTOR SYSTEM AND AN INTERFACE APPARATUS FOR A LINEAR MOTOR

CROSS-REFERENCE TO PRIOR APPLICATION

Priority is claimed to European Patent Application No. EP 18 213 984.0, filed on Dec. 19, 2018, the entire disclosure of which is hereby incorporated by reference herein.

FIELD

This present invention relates to specific embodiments of an interface apparatus for a linear motor, in particular for releasably attaching a primary part of a linear motor to a carriage. Moreover, the present invention relates to specific embodiments of a linear motor system, a carriage, a carriage system and a method.

BACKGROUND

Linear motors are used, for example, when the aim is a highly accurate and, in some instances, also rapid positioning of objects, such as a machine part of a machine tool. In contrast to a conventional rotary motor, in linear motors, the need is thereby eliminated for a gear unit interposed between the linear motor and the object to be driven. A primary part of the linear motor can thereby be attached to the bottom side of a carriage that carries the machine part to be moved or some other object. The carriage is thereby moved on rails or some other linear guide. A secondary part of the linear motor, which typically includes a magnetic track, is thereby immovably fixed along the linear guide to enable a magnetic reciprocal action between the primary part and the secondary part in order to drive the carriage. A linear motor is described, for example, in U.S. Pat. No. 8,030,804 B2.

In known linear motor systems, the primary part of the linear motor is suspended from the bottom side of the carriage. To that end, the primary part is screwed, for example, from above to a cross member of the carriage. At the same time, in customary applications, an object to be moved by the carriage, such as a machine tool, for instance, is placed supportingly on the top side of the carriage.

What is problematic in this connection is that removing the primary part from the carriage or attaching it thereto, for example, for replacement or maintenance purposes, requires accessing the primary part attachment from above. This often entails considerable complexity. In most cases, namely, the machine tool or the object to be moved must first be removed from the top side of the carriage.

SUMMARY

In an embodiment, the present invention provides an interface apparatus for releasably attaching a primary part of a linear motor to a carriage. An attachment module is configured to attach the primary part of the linear motor to the interface apparatus. At least one insertion portion is configured to permit insertion into a holding portion of the carriage along an axial direction of the linear motor. At least one blocking apparatus is configured to releasably block the at least one insertion portion in the holding portion of the carriage.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
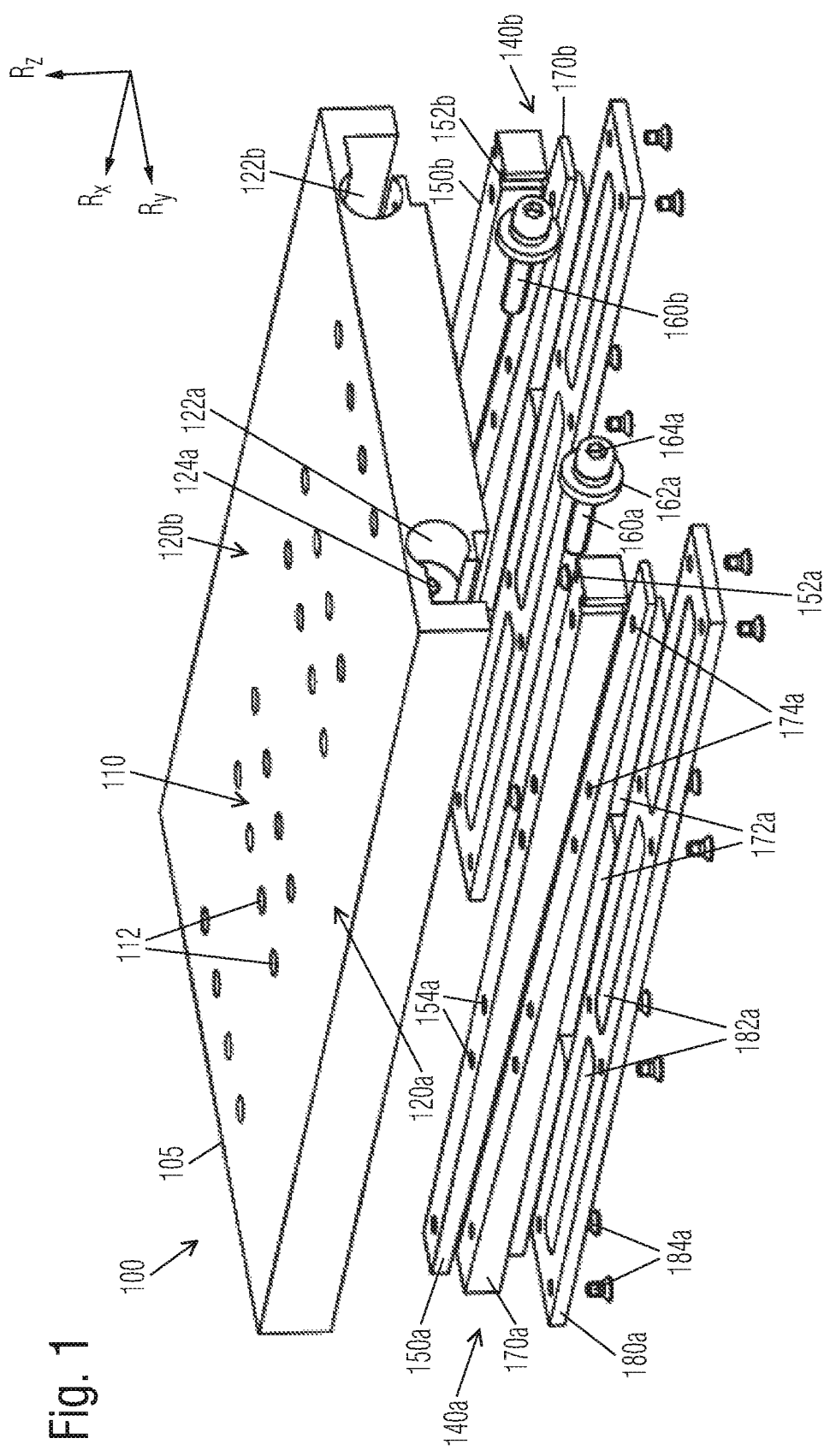
FIG. 1 exemplarily and schematically shows an exploded view of an interface apparatus in accordance with a specific embodiment.

In an embodiment, the present invention recognizes and advantageously overcomes the aforementioned disadvantages of known linear motor systems by providing a releasable attachment for a linear motor.

Against this background, an interface apparatus for releasably attaching a primary part of a linear motor to a carriage is provided in accordance with an embodiment of the present invention.

In accordance with a first embodiment, such an interface apparatus includes an attachment module for attaching a primary part of a linear motor to the interface apparatus. Moreover, the interface apparatus includes at least one insertion portion designed to allow insertion into a holding portion of a carriage along an axial direction of the linear motor, and at least one blocking apparatus for releasably blocking the insertion portion in the holding portion of the carriage.

The axial direction may extend parallel to a drive direction of the linear motor.

The blocking apparatus may include at least one of a wedge, a spring, a magnet and a hydraulic system. In addition, the blocking apparatus may be designed for blocking the insertion portion in the holding portion of the carriage by clamping.

The blocking apparatus may include at least one wedge and at least one screw that are movably disposed relative to the interface apparatus. The wedge and the screw may be thereby configured to allow movement of the wedge in response to actuation of the screw relative to the interface apparatus. In particular, the wedge may have at least one groove, and the screw may include at least one ridge which engages in the groove of the wedge.

The wedge may be moved in response to actuation of the screw parallel to the axial direction. The wedge may thereby be adapted to clamp the insertion portion in a second direction that differs from the axial direction. Relative to the carriage, the second direction may extend in parallel to a vertical or a lateral direction.

In addition, the blocking apparatus may include at least one clamping element that is movably disposed relative to the interface apparatus parallel to the second direction. In this context, the wedge and the clamping element may thereby be configured to allow movement of the clamping element in response to movement of the wedge.

The interface apparatus may include two insertion portions, against each of which a blocking apparatus is positioned and which are disposed on opposing sides of the attachment module. The insertion portions may each adjoin the attachment module laterally relative to the carriage.

The interface apparatus may be in the form of an interface plate. Additionally or alternatively, the interface apparatus may have at least one cooling channel for cooling the primary part of the linear motor.

A second embodiment of the present invention provides a carriage for use with a linear motor. The carriage includes at least one holding portion for accommodating at least one insertion portion of an interface apparatus of the type presented here.

A third embodiment of the present invention provides a carriage system, which includes a carriage and an interface apparatus of the type presented here. The at least one holding portion of the carriage is adapted for accommodating the at least one insertion portion of the interface apparatus along the axial direction.

A fourth embodiment of the present invention provides a linear motor system, which includes a carriage and an interface apparatus of the type presented here, respectively, as well as a linear motor having a primary part and a secondary part. The primary part of the linear motor is attachable to the attachment module of the interface apparatus. In addition, the at least one holding portion of the carriage is adapted for accommodating the at least one insertion portion of the interface apparatus along the axial direction.

A fifth embodiment of the present invention provides a method for releasably attaching a primary part of a linear motor to a carriage. The method includes providing a linear motor system. The linear motor system thereby includes an interface apparatus having an attachment module, at least one insertion portion, and at least one blocking apparatus; a linear motor having a primary part and a secondary part, the primary part of the linear motor being attached to the attachment module of the interface apparatus and to a carriage having at least one holding portion. In addition, the method includes inserting the at least one insertion portion of the interface apparatus into the at least one holding portion of the carriage along an axial direction of the linear motor. The method also includes actuating the at least one blocking apparatus in order to releasably block the at least one insertion portion in the at least one holding portion.

In the present description, directional indications relate to a linear motor system in which the described technical methods are realized. Axial direction Rx thereby refers to a direction parallel to a drive direction of the linear motor, and a vertical direction Rz to a supporting or bearing direction of the carriage orthogonal thereto, for instance, for a bearing load or machine tool to be placed thereon. A lateral direction Ry refers to a direction that is orthogonal to the aforementioned directions. The transverse extent of a linear guide of the linear motor system, as well as the transverse extent of a secondary part of the linear motor, for example, in the form of a magnetic track, typically extend in lateral direction Ry.

FIG. 1 shows exemplarily and schematically an exploded view of an interface apparatus 100. Illustrated interface apparatus 100 is provided, in particular for releasably attaching a primary part of a linear motor to a carriage.

Interface apparatus 100 includes a body 105 which essentially extends in a plate shape in a plane that is spanned by axial direction Rx and lateral direction Ry. In a middle region, body 105 has an attachment module 110 which is used for attaching a primary part of a linear motor to the bottom side of body 105. To this end, a plurality of bores 112 traversing body 105 are provided in attachment module 110, which, for example, allow the primary part to be screwed to the bottom side of body 105.

Provided in each case on both sides, adjoining attachment module 110 is an insertion portion 120a, 120b. Insertion portions 120a, 120b are each adapted for insertion into a corresponding holding portion of a carriage along axial direction Rx.

In the area of each of insertion portions 120a, 120b, a recess 122a, 122b is provided in body 105. Recesses 122a, 122b are each used for accommodating a blocking apparatus 140a, 140b, which makes possible a releasable blocking of the particular insertion portion 120a, 120b in the corresponding holding portion of the carriage.

Blocking apparatuses 140a, 140b and recesses 122a, 122b are essentially symmetrical in form. Therefore, for the sake of simplicity, reference is made in the following only to blocking apparatus 140a that is to the left in axial direction Rx.

Blocking apparatus 140a is designed for clamping insertion portion 120a in a corresponding holding portion of a carriage in orthogonal direction Rz. For this purpose, blocking apparatus 140a includes a clamping assembly 150a, 170a having a wedge 150a that is movable in axial direction Rx and a counterpart in the form of a wedge-shaped clamping element 170a for force distribution. The tapered sides of wedge 150a and of clamping element 170a are thereby aligned to each other.

Recess 122a is configured to accommodate wedge 150a and clamping element 170a. Wedge 150a and clamping element 170a are thereby held by a frame element 180a in recess 122a. For this, frame element 180a is fastened by screws 184a to the bottom side of body 105.

Frame element 160a has a plurality of cut-outs 182a through which corresponding projections 172a of clamping element 170a project. A depth of projections 172a is dimensioned to be greater than a thickness of frame element 160a to allow projections 172a to extend through a bottom side of frame element 180a.

Projections 172a of clamping element 170a disposed in cut-outs 182a limit a movability of clamping element 170a to a direction parallel to vertical direction Rz. Relative thereto, wedge 150a is movable parallel to axial direction Rx. Thus, the illustrated configuration of wedge 150a and of clamping element 170a moves wedge 150a in the insertion direction thereof, pressing clamping element 170a toward frame element 180a.

Conversely, wedge 150a moving counter to the insertion direction thereof creates clearance for clamping element 170a in cut-out 122a in vertical direction Rz, making clamping element 170a vertically movable. Thus, a depth, by which projections 172a project through the bottom side of frame element 180a, may be reduced, for example, by pressing in projections 172a.

Wedge 150a features at least one lateral groove 152a to hold, as well as to move the same in axial direction Rx. Moreover, as part of blocking apparatus 140a, interface apparatus 100 includes a screw 160a having a ridge 162a designed to engage in groove 152a of wedge 150a. Wedge 150*a* is held in axial direction Rx in response to screw 160*a* being screwed into a threaded bore 124*a* in the area of recess 122*a*. At the same time, an insertion depth of wedge 150*a* in axial direction Rx is adjustable by a depth of engagement of screw 160*a* in threaded bore 124*a*. For this, at the outwardly facing end thereof, the screw has a tool receiving socket 164*a*. In the example shown, each of wedges 150*a*, 150*b* has a groove 152*a*, 152*b* on both sides. This permits identically designed wedges 150*a*, 150*b*.

The described mechanism of action of blocking apparatus 140*a* makes it possible to modify the depth in response to actuation of screw 160*a*, for example, with the aid of a fastening tool inserted into tool receiving socket 164*a* of screw 160*a*, by which projections 172*a* of clamping element 170*a* are held to project through the bottom side of frame element 180*a*. The thus variable depth of projections 172*a* may be used to effect a clamping of interface apparatus 100 in a holding portion of a carriage in a reversible manner.

A good functionality of wedge assembly 150*a*, 170*a* presupposes that the tapered surfaces of wedge 150*a* and of clamping element 170*a* be precision ground relative to each other to achieve a favorable force distribution between these parts and avoid excessive friction. For a favorable force distribution relative to the surrounding apparatus parts, it is also advantageous when the outer surfaces of wedge 150*a* and of clamping element 170*a*, including the bearing surfaces of projections 172*a*, are carefully smoothed by grinding. To facilitate such a grinding process, mutually aligned bores 154*a*, 174*a* are provided in wedge 150*a* and clamping element 170*a*.

In a preferred grinding process, the tapered surface of wedge 150*a* is ground, and bores 154*a*, 174*a* are then used to join together wedge 150*a* and clamping element 170*a*. The top side of wedge 150*a* is subsequently precision smoothed, and the bearing surfaces of projections 172*a* are processed by grinding, so that they likewise extend smoothly and in parallel to the top side of wedge 150*a* with a tolerance of a few micrometers. In the case of a wedge assembly 150*a*, 170*a* machined in this manner, wedge 150*a* and clamping element 170*a* form an individual, mutually complementing component pair, whose individual components are not to be interchanged with those of other wedge assemblies 150*b*, 170*b*.

Figure 2:
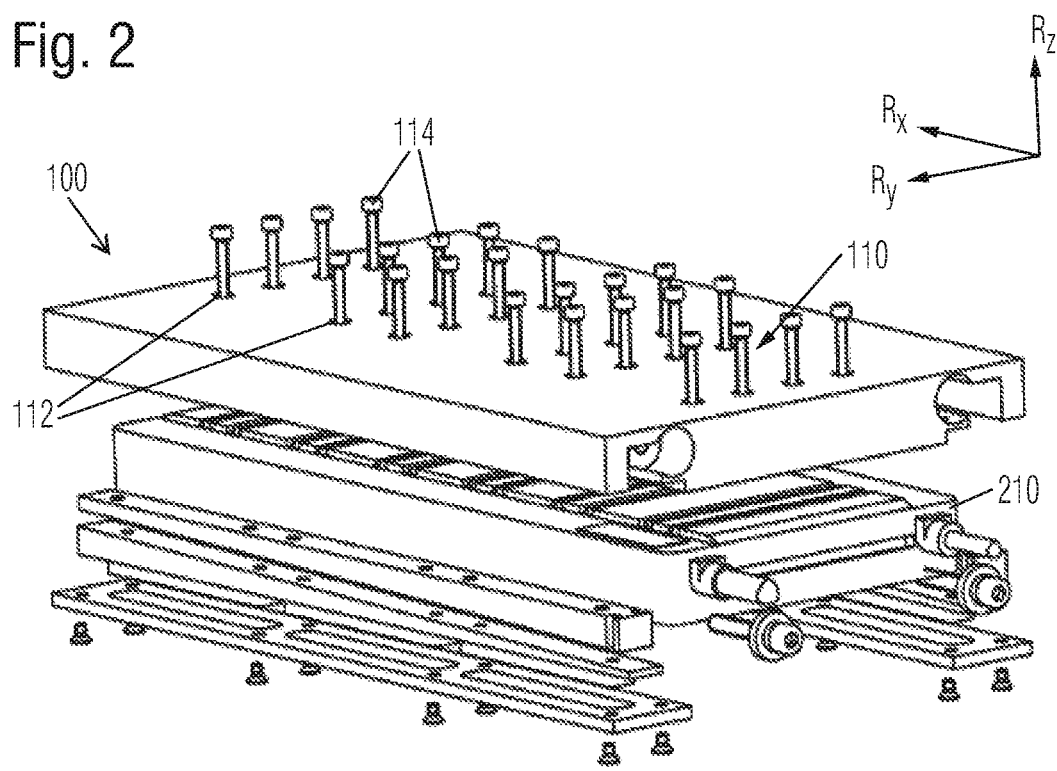
FIG. 2 exemplarily and schematically shows an exploded view of an interface apparatus in accordance with a specific embodiment including a primary part of a linear motor mounted thereon.

FIG. 2 shows interface apparatus 100 from FIG. 1 and a primary part 210 of a linear motor located underneath attachment module 110. Also illustrated are a plurality of screws 114, which are located in bores 112 of interface apparatus 100 and are used for attaching primary part 210 to interface apparatus 100 by screwing of the same into corresponding screw holes on the top side of primary part 210. Primary part 210 of the linear motor is designed to act reciprocally with a secondary part of the linear motor in the form of a magnetic track to thereby effect a driving of the linear motor system.

Figure 3:
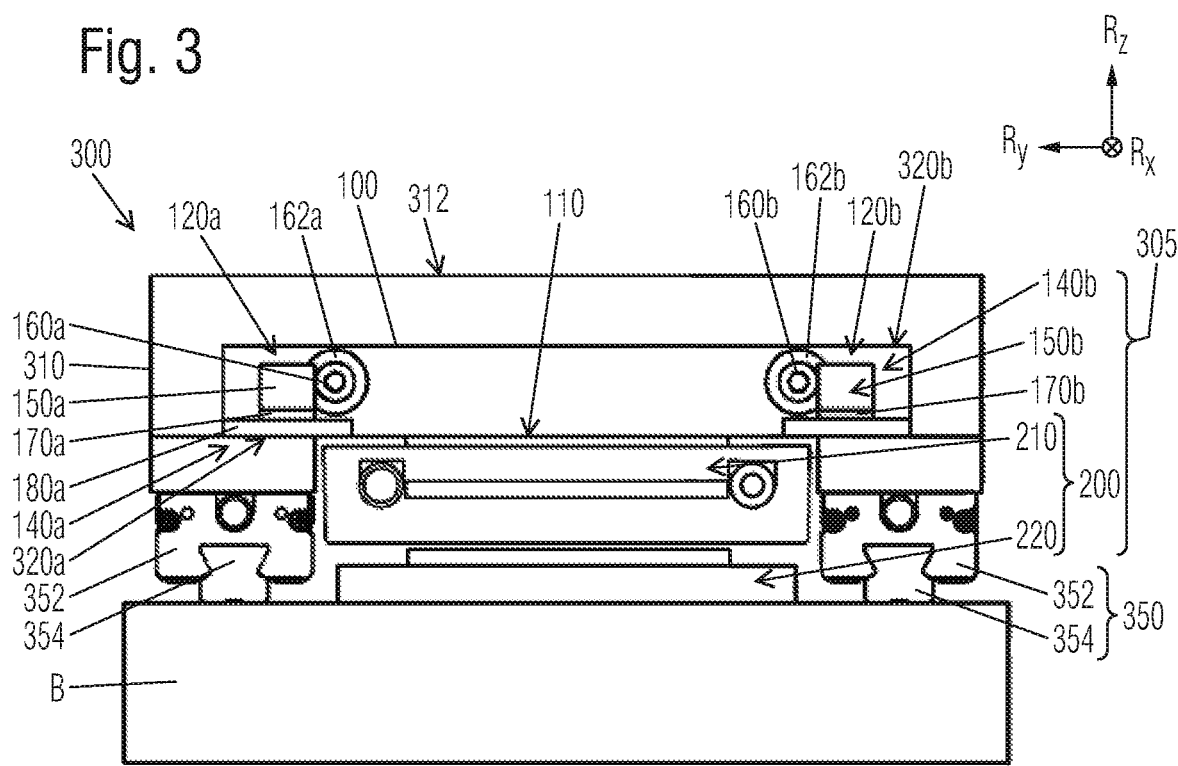
FIG. 3 exemplarily and schematically shows a rear view of a linear motor system in accordance with a specific embodiment.

FIG. 3 shows exemplarily and schematically a rear view of a linear motor system 300. Linear motor system 300 includes a carriage 310, to which a primary part 210 of a linear motor 200 is releasably attached. For the movement thereof in axial direction Rx of linear motor 200 along a linear guide 350, carriage 310 is mounted on a machine bed B (shown here in cross section). In the example shown here, linear guide 350 includes two parallel extending rails 354 which are immovably fixed on machine bed B and upon which carriage 310 is supported by chassis 352. Also in the illustrated example, secondary part 220 of linear motor 200 in the form of a magnetic track is immovably fixed on machine bed B between rails 354.

Primary part 210 is detachably attached to carriage 310 via an interface apparatus 100. Interface apparatus 100 is, for example, that described in connection with FIGS. 1 and 2. The assertions made in connection with FIGS. 1 and 2 hold correspondingly for interface apparatus 100 from FIG. 3. In particular, the same reference numerals denote like features.

Interface apparatus 100 is disposed in carriage 310 in a way that allows each of insertion portions 120*a*, 120*b* thereof to be accommodated in a holding portion 320*a*, 320*b* of carriage 310 and releasably attached there by clamping with the assistance of blocking apparatuses 140*a*, 140*b*. For this, as corresponding parts of a carriage system 305, carriage 310 and interface apparatus 100 complement each other. Primary part 210 is attached to attachment module 110 on the bottom side of interface apparatus 100, for example, screwed thereto, as described in connection with FIG. 2.

It is discernible in FIG. 3 how ridge 162*a*, 162*b* of each of screws 160*a*, 160*b* engages in a lateral groove 152*a*, 152*b* of particular wedge 150*a*, 150*b* to hold and adjust wedges 150*a*, 150*b* in axial direction Rx. Each of screws 160*a*, 160*b* is thereby screwed into a respective bore 124*a* of interface apparatus 100 until an appropriate insertion depth of each of wedges 150*a*, 150*b* is reached that produces a necessary clamping force in vertical direction Rz on each of holding portions 320*a*, 320*b* that is needed to attach interface apparatus 100 with the necessary force to carriage 310.

FIG. 3 clarifies that the technical methods described herein allow interface apparatus 100, together with primary part 210 of linear motor 200, to be inserted and removed parallel to axial direction Rx. In the illustrated example, as actuating elements of blocking apparatuses 140*a*, 140*b*, also screws 160*a*, 160*b* are accessible and operable parallel to axial direction Rx. This is especially beneficial to a use of linear motors in connection with applications where a functional assembly, for example, a machine tool or a transport device, is located on a top side 312 of carriage 310. In such cases, the technical methods described above allow a primary part 210 to be installed and removed, without built-on accessories of carriage 310 having to be removed for this purpose or making access more difficult.

Figure 4A:
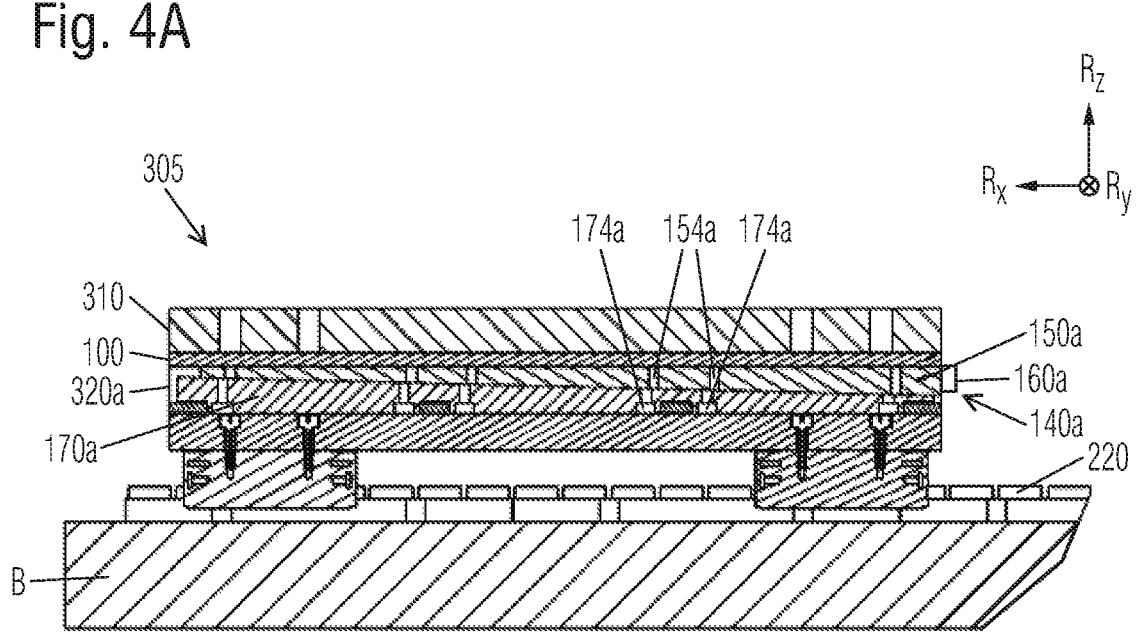
FIG. 4A and FIG. 4B exemplarily and schematically show sectional views of a linear motor system in the context of different positions of the blocking apparatus in accordance with a specific embodiment.

FIG. 4A shows a sectional view along a vertical longitudinal plane of a carriage system 305, as described in connection with FIG. 3. The sectional plane thereby resides across the width of one of blocking apparatuses 140*a* that include wedge 150*a* and clamping element 170*a*. In the illustrated example, wedge 150*a* is located in a released position of blocking apparatus 140*a*. A portion of screw 160*a* thereby projects beyond the rear side of carriage system 305. In addition, bores 154 traversing wedge 150*a* are offset in the rearward direction relative to corresponding bores in clamping element 174*a*. The illustrated position of wedge 150*a* does not produce any or only a small clamping force on clamping element 170*a*, making it possible for interface apparatus 100 to be removed from carriage 310 in axial direction Rx. No primary part of a linear motor is attached to illustrated carriage system 305.

Figure 4B:
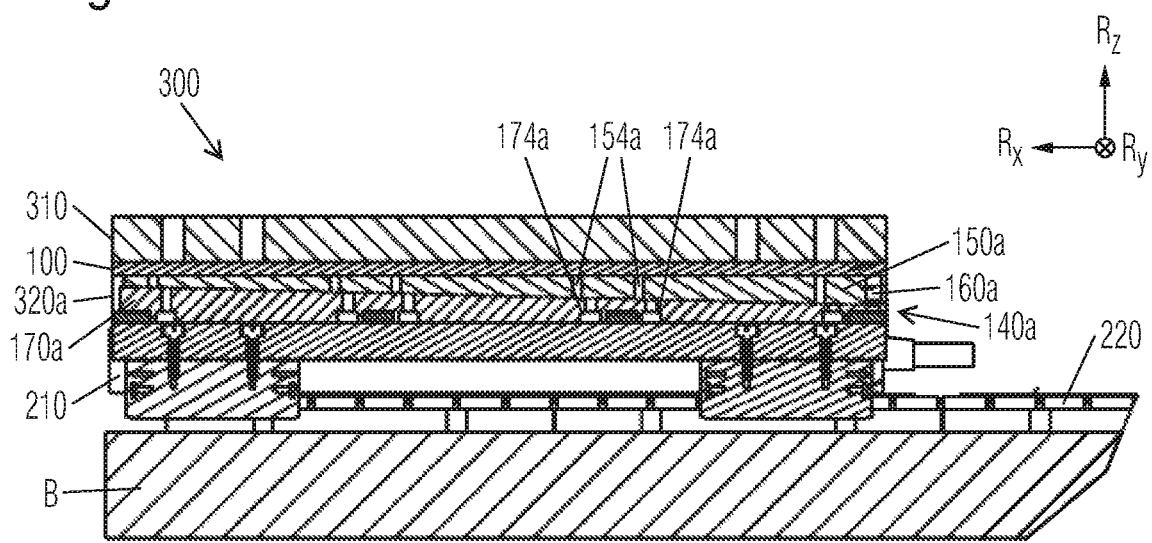

FIG. 4B shows a sectional view of a linear motor system 300. Linear motor system 300 is that from FIG. 3, for example. With reference to carriage 310, the cross-sectional plane corresponds to the cross-sectional plane through carriage system 305 of FIG. 4A. In the example of FIG. 4B, a primary part 210 is thereby releasably attached to carriage 310.

In a departure from FIG. 4A, blocking apparatus 140*a* is in a blocking position in FIG. 4B. In comparison to the position in FIG. 4A, wedge 150*a* is thereby moved further in the insertion direction. In the illustrated position of wedge 150a, no portion of screw 160a projects beyond the rear side of carriage 310. In addition, bores 154a in wedge 150a are shifted relative to corresponding bores 174a in clamping element 170a in the insertion direction of wedge 150a.

In the position illustrated in FIG. 4B, the projections of clamping element 170a project further beyond a bottom side of insertion portion of interface apparatus 100 than in the case of the position shown in FIG. 4A. Thus, clamping element 140a effects a clamping of interface apparatus 100 relative to carriage 310.

Figure 5:
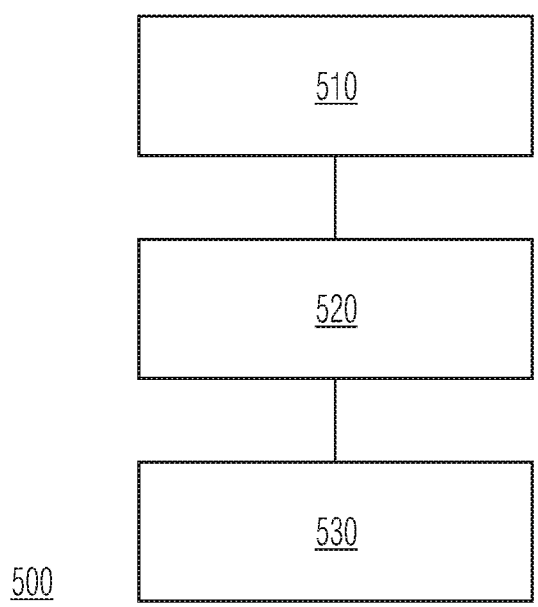
FIG. 5 shows a flow chart of a method for releasably attaching a primary part of a linear motor to a carriage in accordance with a specific embodiment.

FIG. 5 illustrates a flow chart of a method 500 for releasably attaching a primary part of a linear motor to a carriage. The method includes making a linear motor system ready for use, step 510. The linear motor system thereby includes an interface apparatus having an attachment module, as well as at least one insertion portion, and a blocking apparatus. The interface apparatus is such a one as described in connection with FIG. 1 through 4B, for example. Moreover, the linear motor system includes a linear motor having a primary part and a secondary part, the primary part of the linear motor being attached to an attachment module of the interface apparatus, as well as to a carriage having at least one holding portion. The linear motor system is, for example, such a one as described in connection with FIG. 3.

Method 500 also includes inserting, step 520, the at least one insertion portion of the interface apparatus into the at least one holding portion of the carriage along an axial direction of the linear motor. Moreover, method 500 includes actuating, step 530, the at least one blocking apparatus in order to releasably block the at least one insertion portion in the at least one holding portion.

The technical methods described above are illustrated with reference to the example of an interface apparatus 100, as shown in FIG. 1. It is understood, however, that the advantages of the technical method described above may also be achieved by modified implementations. In deviating examples of interface apparatus 100, the wedge assemblies of blocking apparatuses are aligned to exert a clamping force in lateral direction Ry, for example. In further examples, the wedge assemblies are aligned in lateral direction Ry, so that an insertion direction of at least one of the wedges extends in parallel to lateral direction Ry. In other examples, interface apparatus 100 is designed to achieve a clamping relative to the carriage using technical methods other than those described. For example, some of these implementations include a hydraulic or pneumatic clamping device. In still other examples, a controllable magnet is used to enable the interface apparatus to be attached to a carriage.

In some examples, interface apparatus 100 also includes one or a plurality of cooling channels for cooling a primary part of a linear motor attached thereto. Moreover, in other examples, the geometry of interface apparatus 100 deviates from that of a plate. Some of these implementations are suited for facilitating an exchange of a primary part of a linear motor that is attached to a carriage without requiring an access via a top side of the carriage.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. An interface apparatus for releasably attaching a primary part of a linear motor to a carriage, the interface apparatus comprising:
   an attachment module configured to attach the primary part of the linear motor to the interface apparatus;
   at least one insertion portion configured to permit insertion into a holding portion of the carriage along an axial direction of the linear motor; and
   at least one blocking apparatus configured to releasably block the at least one insertion portion in the holding portion of the carriage.

2. The interface apparatus as recited in claim 1, wherein the blocking apparatus includes at least one of a wedge, a spring, a magnet and a hydraulic system.

3. The interface apparatus as recited in claim 2, wherein the blocking apparatus is configured to block the insertion portion in the holding portion of the carriage by clamping.

4. The interface apparatus as recited in claim 3, wherein the blocking apparatus includes at least one wedge and at least one screw, which are movably disposed relative to the interface apparatus, in such a way that the wedge is movable in response to actuation of the screw relative to the interface apparatus.

5. The interface apparatus as recited in claim 4, wherein the wedge has at least one groove, and wherein the screw has at least one ridge which engages in the groove of the wedge.

6. The interface apparatus as recited in claim 4, wherein the wedge is movable in response to actuation of the screw parallel to the axial direction and is configured to effect a clamping of the insertion portion in a second direction that differs from the axial direction.

7. The interface apparatus as recited in claim 6, wherein the blocking apparatus further comprises at least one clamping element that is movably disposed relative to the interface apparatus parallel to the second direction, the wedge and the clamping element being configured to permit movement of the clamping element in response to movement of the wedge.

8. The interface apparatus as recited in claim 1, wherein two insertion portions are disposed on opposing sides of the attachment module, against each of which a respective blocking apparatus is positioned.

9. The interface apparatus as recited in claim 1, further comprising at least one cooling channel for cooling the primary part of the linear motor.

10. A carriage for use with a linear motor, the carriage comprising the holding portion which is configured to accommodate the at least one insertion portion of the interface apparatus as recited in claim 1.

11. A carriage system comprising the interface apparatus as recited in claim 1, and a carriage, wherein the holding portion of the carriage is configured to accommodate the at least one insertion portion of the interface apparatus along the axial direction.

12. A linear motor system, comprising:
the interface apparatus as recited in claim 1,
the linear motor having the primary part and a secondary part, the primary part of the linear motor being attachable to the attachment module of the interface apparatus, and
a carriage having at least one holding portion configured to accommodate the at least one insertion portion of the interface apparatus along the axial direction.

13. A method for releasably attaching a primary part of a linear motor to a carriage, the method comprising:
providing a linear motor system, which includes:
an interface apparatus having an attachment module including at least one insertion portion and at least one blocking apparatus;
the linear motor having the primary part and a secondary part, the primary part of the linear motor being attached to the attachment module of the interface apparatus and to a carriage having at least one holding portion;
inserting the at least one insertion portion of the interface apparatus into the at least one holding portion of the carriage along an axial direction of the linear motor; and
actuating the at least one blocking apparatus in order to releasably block the at least one insertion portion in the at least one holding portion.

* * * * *